US008067854B2

(12) United States Patent
Kobayashi (10) Patent No.: US 8,067,854 B2
(45) Date of Patent: Nov. 29, 2011

(54) OUTPUT CIRCUIT

(75) Inventor: Tomoki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 12/484,987

(22) Filed: Jun. 15, 2009

(65) Prior Publication Data
US 2009/0315398 A1 Dec. 24, 2009

(30) Foreign Application Priority Data

Jun. 20, 2008 (JP) .................................. 2008-162470

(51) Int. Cl.
*H02J 3/00* (2006.01)
(52) U.S. Cl. ................. 307/31; 307/32; 307/33; 307/34; 307/38
(58) Field of Classification Search ..................... 307/29, 307/31–34, 38
See application file for complete search history.

(56) References Cited

U.S. PATENT DOCUMENTS

| | | | |
|---|---|---|---|
| 5,701,597 A * | 12/1997 | Nakanishi et al. | 455/127.1 |
| 6,119,023 A * | 9/2000 | Tomiyori | 455/574 |
| 6,141,170 A | 10/2000 | Hatae et al. | |
| 6,236,238 B1 * | 5/2001 | Tanji et al. | 326/83 |
| 6,744,698 B2 * | 6/2004 | Koyama et al. | 368/204 |
| 7,251,741 B2 | 7/2007 | Kobayashi et al. | |
| 7,365,704 B2 * | 4/2008 | Wang et al. | 345/1.2 |
| 7,456,523 B2 | 11/2008 | Kobayashi | |
| 7,466,200 B2 * | 12/2008 | Fischer | 330/257 |
| 7,489,160 B2 * | 2/2009 | Kimura | 326/30 |
| 7,573,438 B2 * | 8/2009 | Nohara | 345/1.1 |
| 2003/0164723 A1 | 9/2003 | Suzuki | |
| 2004/0009756 A1 * | 1/2004 | Kuranuki et al. | 455/127.1 |
| 2010/0188323 A1 * | 7/2010 | Huang | 345/89 |

FOREIGN PATENT DOCUMENTS

| | | |
|---|---|---|
| JP | 9-135159 | 5/1997 |
| JP | 2000-295088 | 10/2000 |
| JP | 2003-258611 | 9/2003 |

* cited by examiner

*Primary Examiner* — Jared Fureman
*Assistant Examiner* — Adi Amrany
(74) *Attorney, Agent, or Firm* — Fitzpatrick, Cella, Harper & Scinto (57) ABSTRACT

A buffer driving capability control device is provided which can suppress occurrence of radiated noise due to a load driven by large driving power in the case where loads differing in driving power are connected to one terminal. The device includes an output buffer which can switch between the driving capability for driving a load requiring large driving power and the driving capability for driving a load requiring small driving power, and also includes a control period for driving the load requiring the large driving power and a control period for driving the load requiring the small driving power, and during the respective control periods, switches the driving capability of the output buffer to the ones suitable for the corresponding loads.

6 Claims, 10 Drawing Sheets

OUTPUT CIRCUIT

BACKGROUND OF THE INVENTION

1. Field of the Invention

The present invention relates to an output circuit which outputs a signal, and concerns control of driving power of an output buffer.

2. Description of the Related Art

In an integrated circuit, a plurality of loads may be connected to one terminal. In this case, if driving power varies from one load to another, it is necessary to output the driving power of a maximum level to all the loads to ensure normal operations for the loads. This means that a load requiring relatively small driving power will be driven with the driving power of an unnecessarily high level, in which case at the time when the load is driven, distortion and radiated noise will occur in a waveform of a signal being output.

There are various techniques for driving a load connected to a terminal in an integrated circuit. For example, Japanese Patent Application Laid-Open No. 2000-295088 discloses a technique where, for each of a plurality of terminals, a current output logical level is compared with a next output logical level, and if the number of terminals for which the logical level changes is greater than a predetermined number, the driving capability of the output buffer circuit is lowered. Further, Japanese Patent Application Laid-Open No. 2003-258611 discloses a technique where the buffer driving capability is changed stepwise along with the changes in the output level to slow the rising and falling of the waveform, to thereby reduce the noise. Furthermore, Japanese Patent Application Laid-Open No. H09-135159 discloses a technique where, at the time of initial settings, the buffer driving capability is set according to an external device being connected.

With the configuration having a plurality of loads connected to one terminal, however, it is difficult to suppress occurrence of the distortion of the waveform and the radiated noise in the waveform of the output signal.

SUMMARY OF THE INVENTION

In view of the foregoing, an object of the present invention is to provide an output circuit which solves the above-described problems.

According to the present invention, an output circuit for driving a first load and a second load connected via a signal line comprises: an output buffer capable of selectively outputting one of first driving power and second driving power which is greater than the first driving power as driving power of a logical signal to be output to a respective one of the first and second loads; and a control unit having a first period to output a logical signal for controlling the first load with the first driving power and a second period to output a logical signal for controlling the second load with the second driving power, and performing time-sharing control with the first period and the second period so as to control driving of the output buffer.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
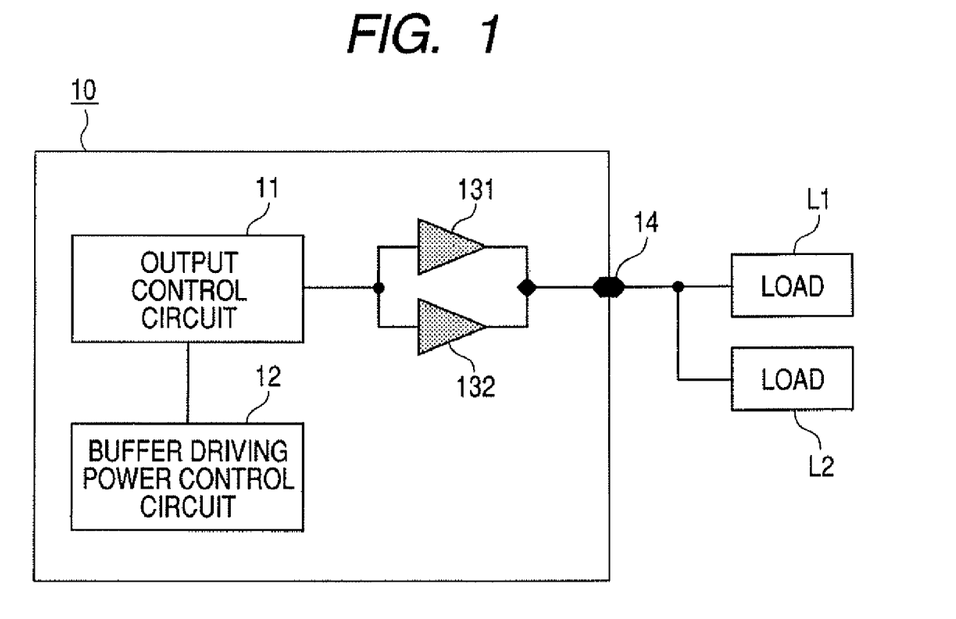
FIG. 1 illustrates a circuit device 10 according to a first embodiment of the present invention.

FIG. 1 illustrates a circuit device 10 according to a first embodiment of the present invention. The circuit device 10 includes an output control circuit 11, a buffer driving power control circuit 12, a buffer 131, and a buffer 132. A signal line connected to a terminal 14 is connected to loads L1 and L2.

For example, the load L1 may be an LED and the load L2 may be a controller of an LCD, in which case the output control circuit 11 outputs commands and data to the controller of the LCD, while it outputs to the LED a signal for turning on/off the LED.

The output control circuit 11 controls the logical level (high level or low level) of the output signal. The output control circuit 11 uses the buffer 131 to output a signal to the load L2, while it uses both buffers 131 and 132 to output a signal to the load L1. The load L1 cannot be controlled by outputting the signal using only the buffer 132, because the driving capability of the buffer 132 is insufficient for driving the load L1. The buffer driving power control circuit 12 controls the level of the load driving capability by enabling/disabling the buffers 131 and 132.

Figure 2A:
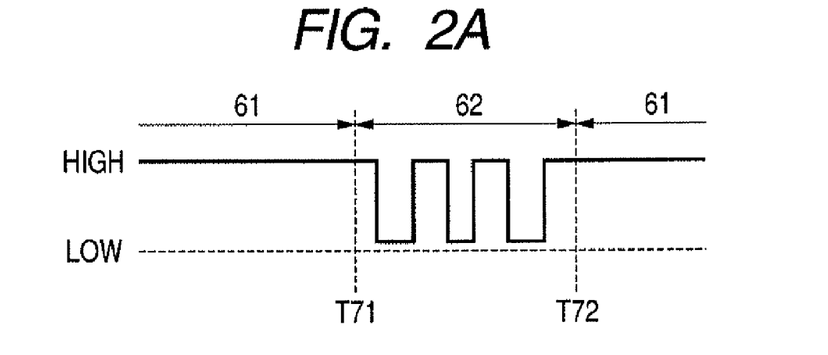
FIGS. 2A, 2B, and 2C illustrate a waveform of a signal output from the circuit device 10.
Figure 2B:
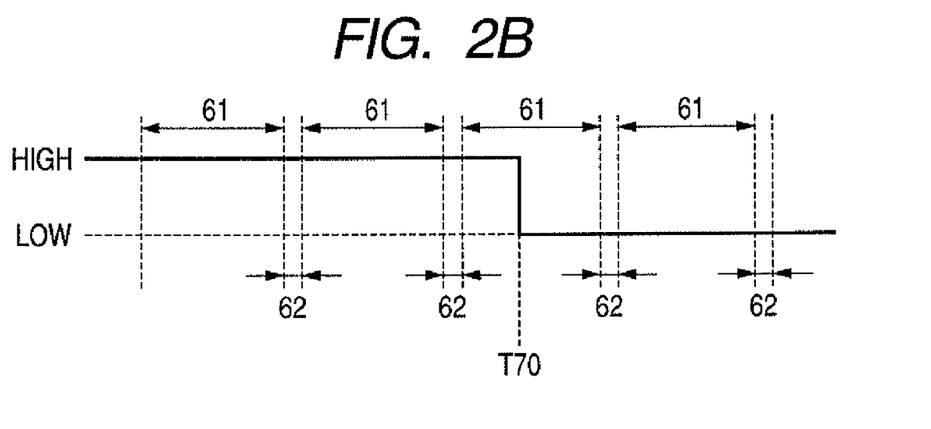

FIGS. 2A and 2B illustrate a signal output from the circuit device 10. The circuit device 10 performs control for driving the load L1 during a period 61, and performs control for driving the load L2 during a period 62. For example, FIG. 2B illustrates the state where a high-level logical signal is output to the load L1, and the logical level of the signal is changed to a low level at the time of T70.

FIG. 2A is an enlarged view of the waveform in and around the period 62 in FIG. 2B. During the period 62, a command or data is output to the load L2. The command is made up of a plurality of bits in a serial format. Here, the driving capability of the circuit device 10 is changed over at T71 and T72. At T71, the buffer 132 in an enable state is disabled. At T72, the buffer 132 is enabled.

As described above, the circuit device 10 performs the drive control of two buffers in a time-sharing manner (time-division manner). For the time-sharing control (time-division control), the control of the load L1 and the control of the load L2 are carried out alternately at predetermined intervals. In the present embodiment, the period 61 is longer than the period 62.

For driving the load L1, the buffers 131 and 132 are both enabled (an enable state). For driving the load L2, the buffer 131 is enabled, whereas the buffer 132 is disabled (a high-impedance state).

Figure 2C:
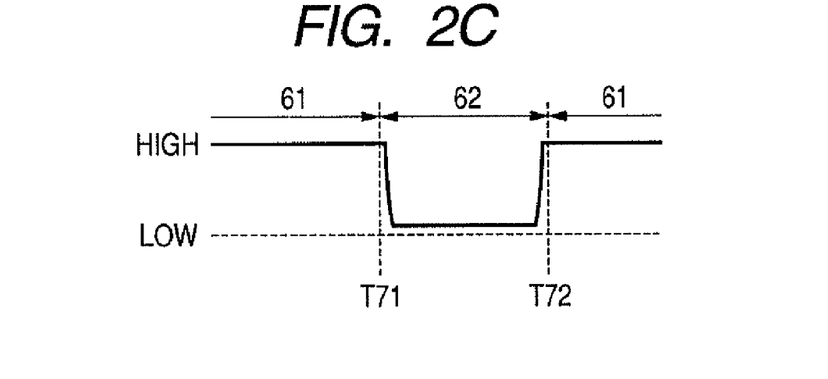

It is noted that the signal output from the output control circuit 11 is not restricted to the signal as illustrated in FIG. 2A. For example, the output control circuit 11 may output a pulse signal as illustrated in FIG. 2C.

Second Embodiment

Figure 3A:
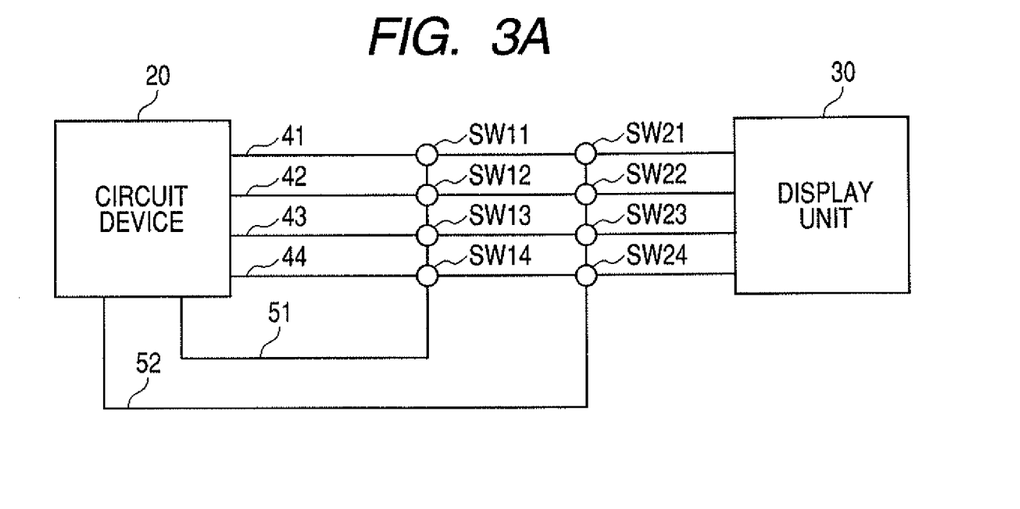
FIG. 3A illustrates connection between the circuit device and the loads according to a second embodiment of the present invention.

A second embodiment of the present invention will now be described. FIG. 3A illustrates connection between a circuit device 20, a display unit 30, and a plurality of switches (SW11 to SW14, and SW21 to SW24). These switches and the display unit 30 are provided in electronic equipment.

In order to obtain information about operations (states) of the switches, output signal lines and input signal lines are connected to the circuit device 20. Logical signals are supplied to the switches via signal lines 41 to 44, and signals reflecting the states of the switches are supplied to the circuit device 20 via signal lines 51 and 52.

For example, the display unit 30 may include an LED. In this case, the LED is on when the logical signal is at a high level, while the LED is off when the logical signal is at a low level.

Figure 3B:
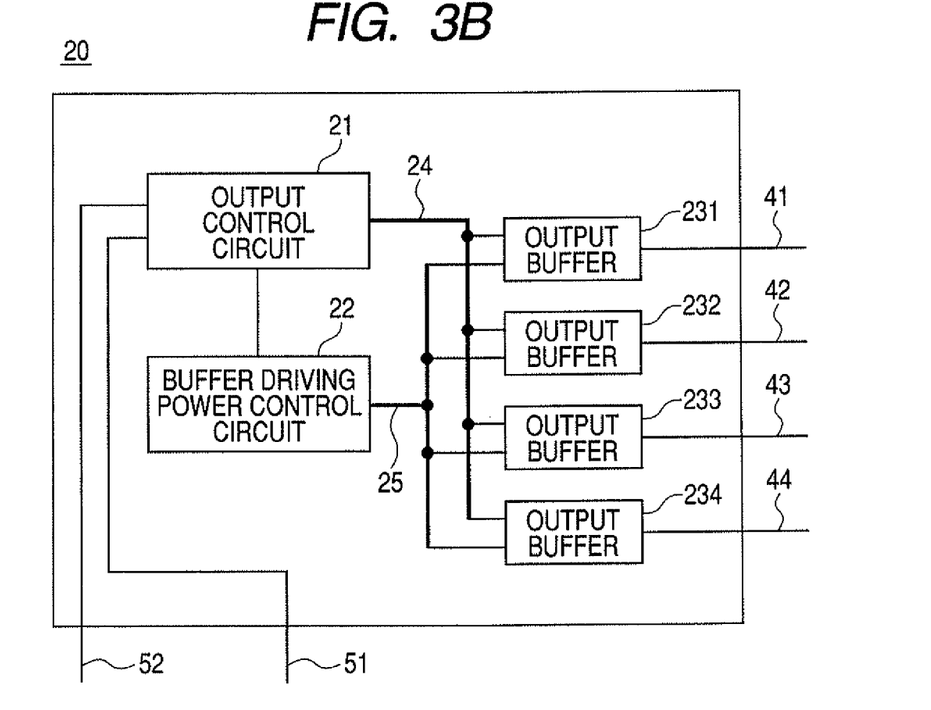
FIG. 3B is a block diagram illustrating a configuration of the circuit device according to the second embodiment.

FIG. 3B is a block diagram illustrating the internal configuration of the circuit device 20. An output control circuit 21 obtains the states of the switches SW11 to SW14 and SW21 to SW24 via the input signal lines 51 and 52.

The output control circuit 21 controls the logical levels of the signals output from output buffers 231 to 234. A buffer driving power control circuit 22 controls driving power of the output buffers 231 to 234. A signal line 24 connects the output control circuit 21 with the output buffers 231 to 234. A signal line 25 connects the buffer driving power control circuit 22 with the output buffers 231 to 234.

Figure 3C:
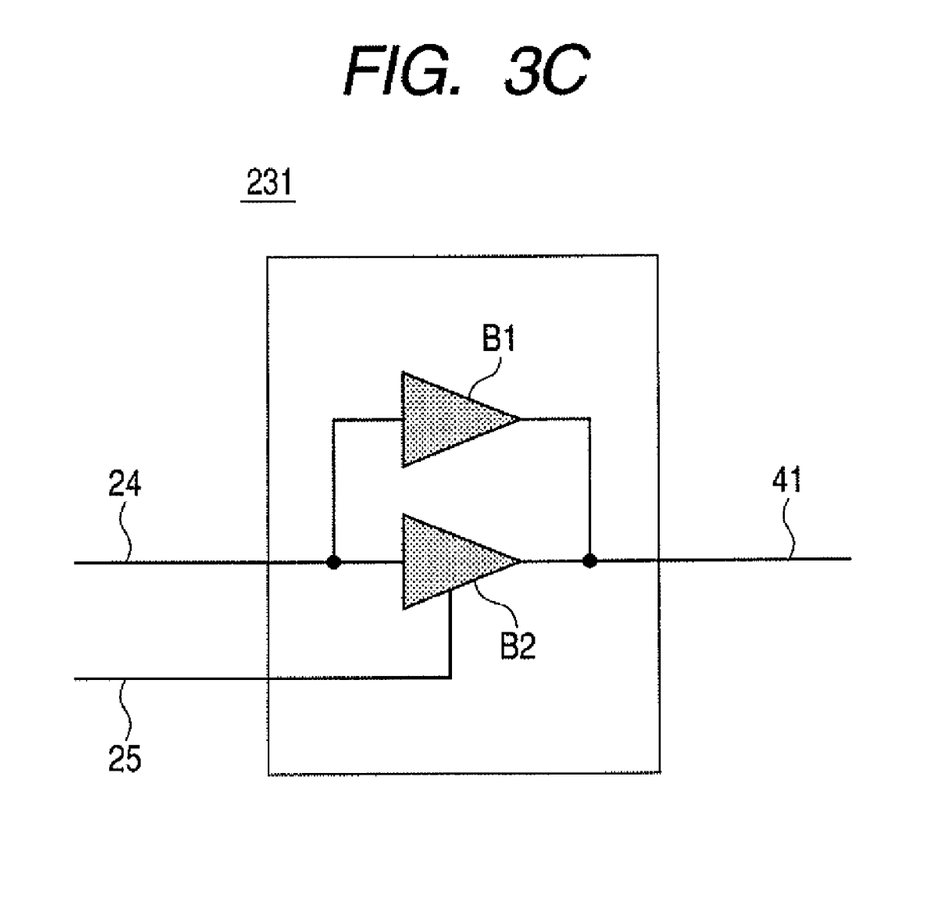
FIG. 3C illustrates a configuration of the output buffer.

FIG. 3C is a circuit diagram illustrating the internal configuration of the output buffer 231. The output buffers 232, 233, and 234 each have a configuration similar to that of the output buffer 231. Buffers B1 and B2 each output, to a signal line 41, a signal at the level according to the signal level (logical level) output from the output control circuit 21. The buffer B2 is enabled or disabled according to the signal output from the buffer driving power control circuit 22.

For controlling the display unit 30, the buffers B1 and B2 are both enabled. Accordingly, the circuit device 20 outputs a current of about 10 mA. For control of obtaining the states of the switches, the buffer B is enabled, while the buffer B2 is disabled. Accordingly, the circuit device 20 outputs a current of about 1 mA.

Figure 4A:
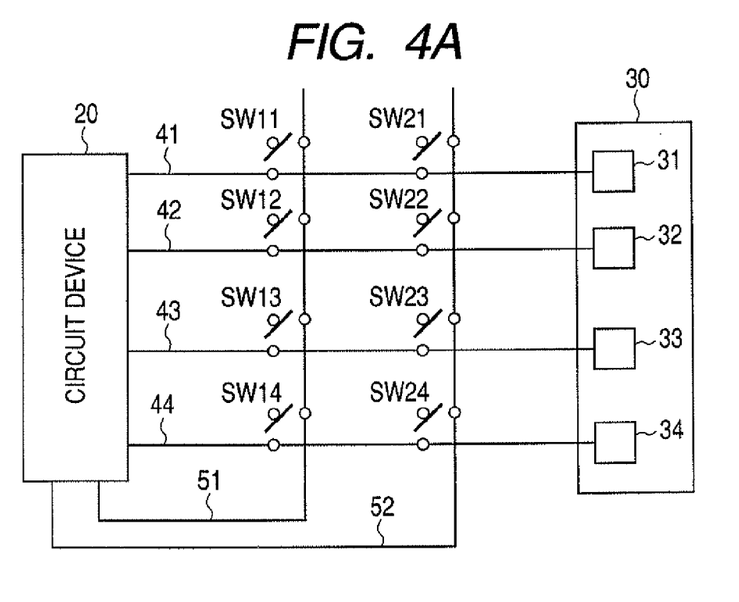
FIG. 4A illustrates in detail the connection illustrated in FIG. 3A.

FIG. 4A illustrates the signal lines and the switches illustrated in FIG. 3A. For example, the switch SW11 has one terminal connected to the signal line 41 and another terminal connected to the signal line 51. When the switch SW11 is pressed, the signal lines 41 and 51 are connected, so that the signal line 41 attains a level equal to that of the signal line 51. If the switch SW11 is not pressed, the signal lines 41 and 51 are not connected with each other, and thus, the signal lines 41 and 51 differ in level from each other.

A key matrix configured with a plurality of switches (SW11 to SW14 and SW21 to SW24) and four LEDs 31 to 34 are connected to the signal lines 41 to 44.

Figure 4B:
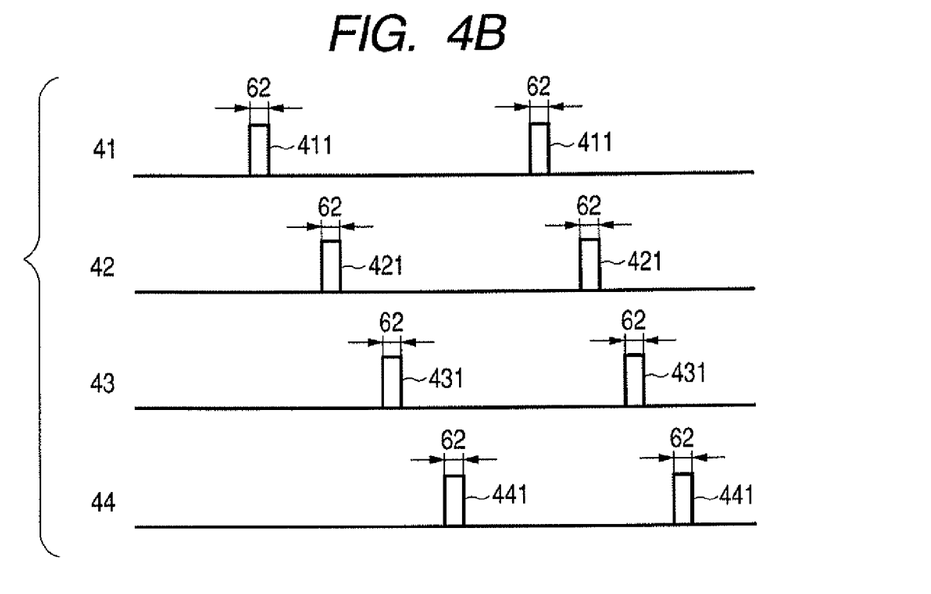
FIG. 4B illustrates when signals are output for respective signal lines.

Further, as illustrated in FIG. 4B, the circuit device 20 outputs pulses 411 to 441 to the signal lines 41 to 44, respectively, at the times corresponding to the buffer control periods 62. Each of the pulses 411 to 441 is output at predetermined intervals. On the other hand, the circuit device 20 monitors the logical levels of the signals input from the signal lines 51 and 52. That is, the circuit device 20 carries out the control of the driving power of the buffers in synchronization with the outputs of the pulses 411 to 441.

Figure 5A:
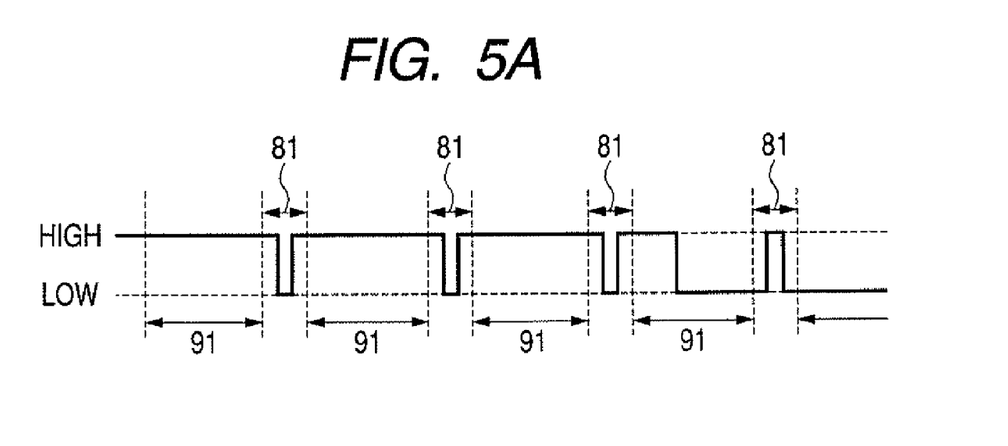
FIGS. 5A and 5B illustrate control of the signal output.

FIG. 5A illustrates a waveform of the signals on the signal lines 41 to 44 illustrated in FIGS. 3A and 3B. Periods 81 and 91 are identical to the periods 62 and 61, respectively, illustrated in FIG. 2C, and thus, description thereof will not be repeated.

The output buffers 231 to 234 illustrated in FIG. 3B each output a driving signal for controlling a plurality of switches during the period 81. On the other hand, the output buffers 231 to 234 each output a driving signal for controlling the display unit 30 during the period 91.

Figure 5B:
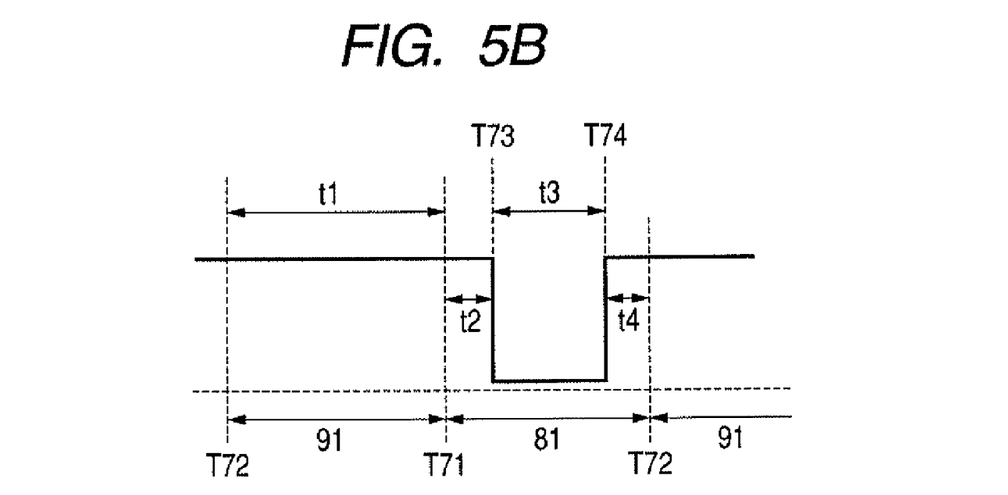

FIG. 5B illustrates the waveform in and around the period 81 in FIG. 5A. At T72, the buffers B1 and B2 are both enabled, and a signal of a logical level (high level) for driving the display unit is output. After a lapse of time t1, at T71, the buffer B2 is disabled (a high-impedance state). After a lapse of time t2, at T73, a signal of a logical level (low level) for controlling the switches is output. After a lapse of time t3, at T74, a signal of a logical level (high level) for driving the display unit is output. After a lapse of time t4, at T72, the buffer B2 is enabled.

Figure 6:
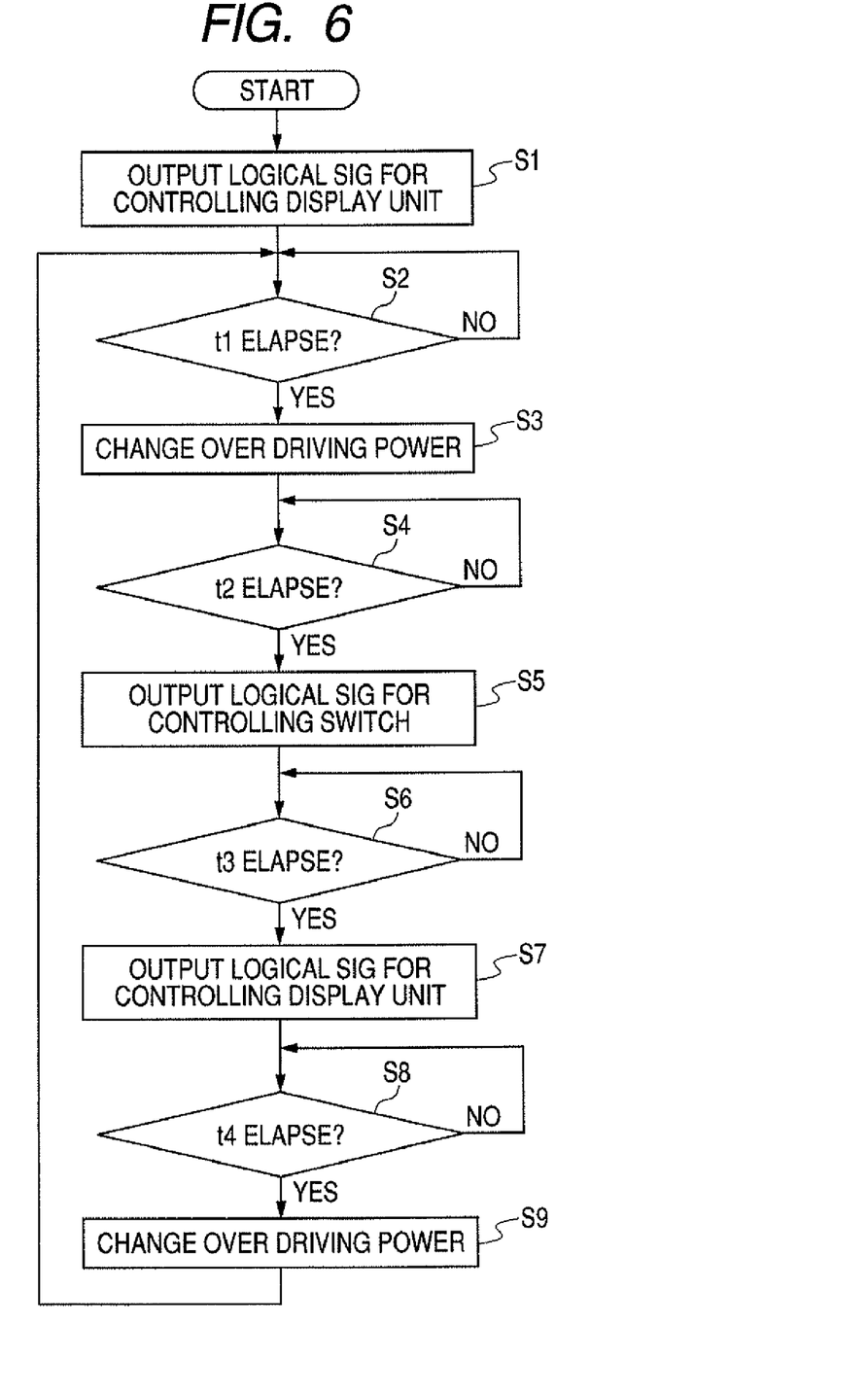
FIG. 6 is a flowchart of the signal output control.

FIG. 6 is a flowchart illustrating the process described above. In S1, a logical signal for controlling the display unit 30 is output, with the buffers B1 and B2 both enabled. In S2, it is determined whether time t1 corresponding to the period 91 has elapsed. The states of the buffers B1 and B2 are maintained if time t1 has not elapsed (No). In S2, if time t1 elapses (Yes), the process proceeds to S3. In S3, the buffer B2 is disabled. That is, the driving power is changed over. In S4, it is determined whether time t2 has elapsed. In S4, if time t2 elapses (Yes), the process proceeds to S5. In S5, a logical signal for controlling the switches is output. In S6, it is determined whether time t3 has elapsed. In S6, if time t3 elapses (Yes), the process proceeds to S7. In S7, a logical signal for controlling the display unit is output. In S8, it is determined whether time t4 has elapsed. In S8, if time t4 elapses (Yes), the process proceeds to S9. In S9, the buffer B2 is enabled. That is, the driving power is changed over. Thereafter, the process returns to S2.

If the ratio of the length of the period 81 to the length of the period 91 increases, the display unit may suffer flickering. Thus, the length of the period 81 is set to an order of a thousandth or less of the length of the period 91.

Further, during the period 81, a current exceeding the driving power of the buffers may flow, depending on the level of the input signal. Thus, the period 81 is set to a duration which is shorter than some μs, taking into consideration the durability of the output buffers 231 to 234.

According to the configuration as described above, the buffers are used as appropriate according to the driving loads such as the switches, which can suppress the occurrence of the radiated noise.

Third Embodiment

Figure 7:
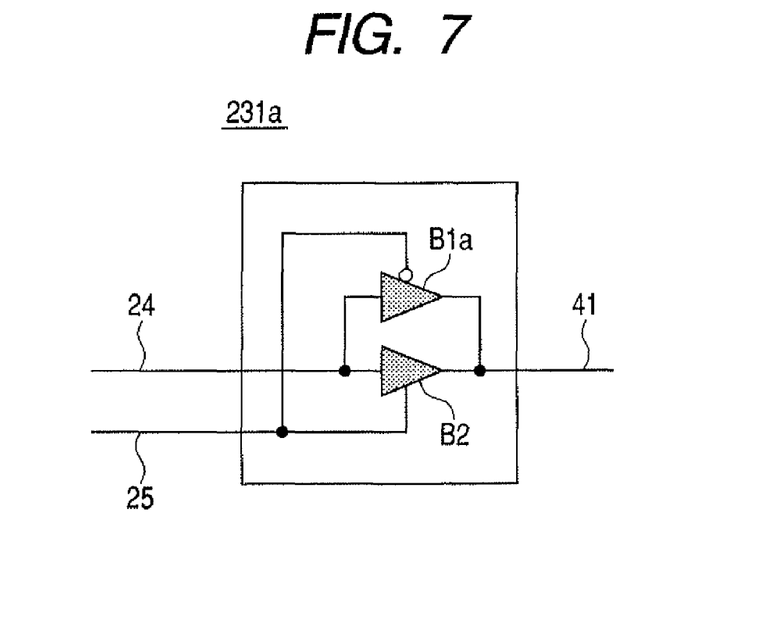
FIG. 7 illustrates a configuration of the output buffer according to a third embodiment of the present invention.

FIG. 7 illustrates how the driving capability is changed over in an output buffer 231a according to a third embodiment of the present invention. Each of output buffers 232a to 234a is identical to the output buffer 231a. Either of buffers B1a and B2 is selected according to a signal on a buffer control signal line 25. The buffer B1a is provided with driving power for controlling switches SW11 to SW14, while the buffer B2 is provided with driving power for controlling a display unit 30.

Figure 8:
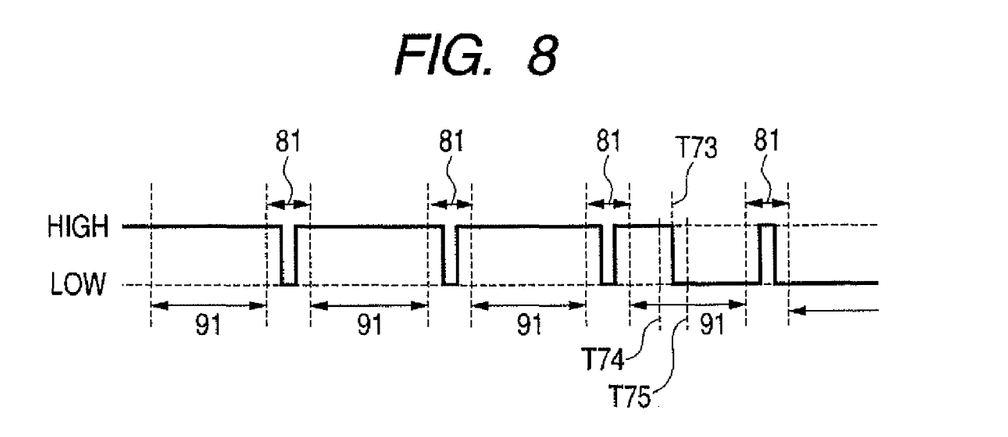
FIG. 8 illustrates a waveform of an output signal according to the third embodiment.

FIG. 8 illustrates a waveform of the signals output to output signal lines 41 to 44. The periods 81 and 91 are identical to those in FIGS. 5A and 5B, and thus, description thereof will not be repeated. Only the points differing from FIGS. 5A and 5B will be described. In the control illustrated in FIG. 8, when the level of the logical signal being output to the display unit 30 is changed at the time T73 during the period 91, driving power of the output buffers is changed over at a time before the time T73, and changed over again at a time after the time T73. More specifically, at T74, the buffer B1a is enabled and the buffer B2 is disabled, and at T75, the buffer B1a is disabled and the buffer B2 is enabled.

With the control as described above, the driving power of the output buffers can be lowered at the time of change of the logical level of the control signal output to the display unit 30, and accordingly, the radiated noise that would be caused by the change in logical level of the control signal can be suppressed.

Figure 9:
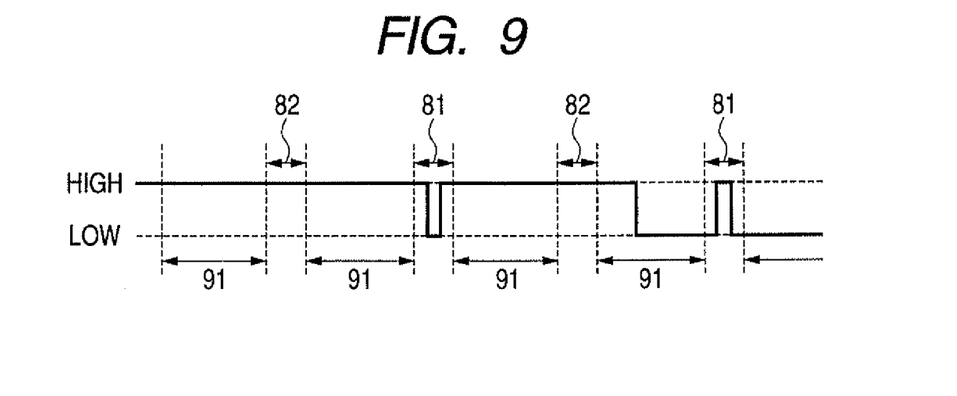
FIG. 9 illustrates another waveform of the output signal according to the third embodiment.

FIG. 9 illustrates control of the output buffers when the control of the switches is not performed.

The period 91 is identical to that in FIGS. 5A and 5B, and thus, description thereof will not be repeated. Only the points differing from FIGS. 5A and 5B will be described. In the control illustrated in FIG. 9, in addition to the period 91 for controlling the display unit and the period 81 for controlling the switches, another period 82 is provided in which neither of the controls is performed. During the period 82, the driving power of the output buffers is not changed over.

The period 82 is provided as part of the control sequence in the case where the control of the switches is suspended for the purposes of saving the power consumption.

<Description of Electronic Equipment>

Figure 10:
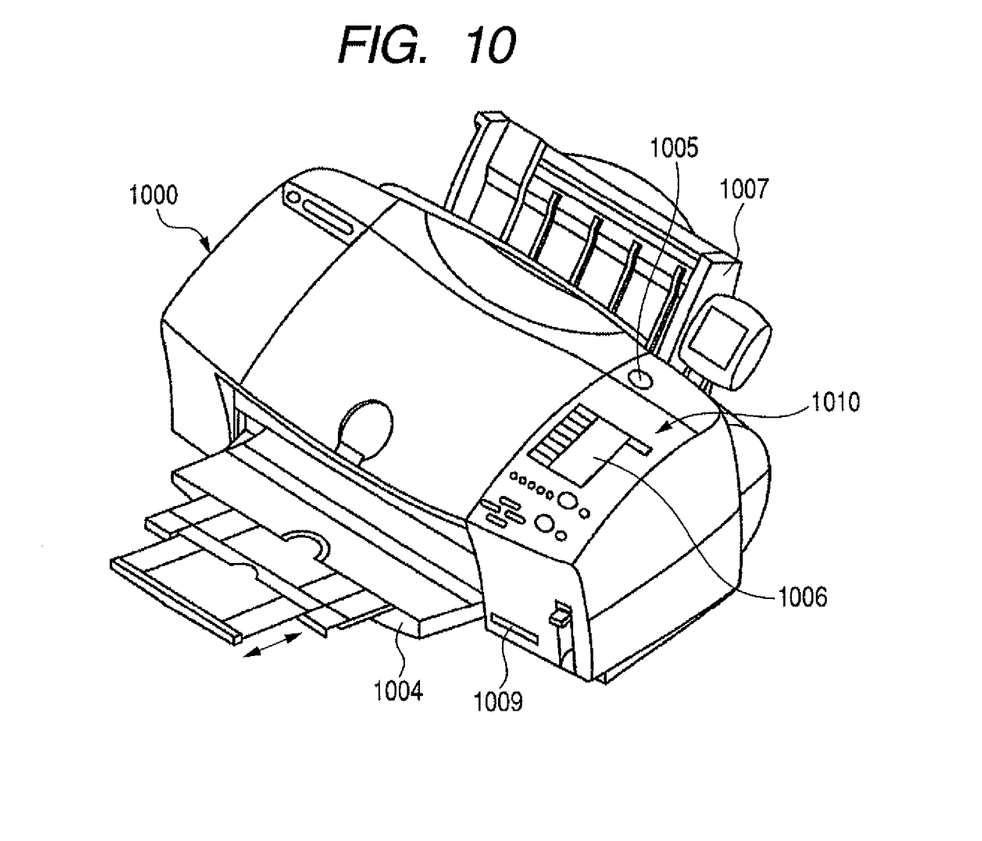
FIG. 10 is a perspective view of electronic equipment.

FIG. 10 is a perspective view of an inkjet printer 1000 which is an example of the electronic equipment to which the first through third embodiments described above are to be applied.

When a user sets a recording paper in a paper feeding unit 1007 and transmits data or a command from a host device (not shown), the printer 1000 feeds the recording paper to start recording by an ink ejected from a recording head, and outputs the resultant paper to a paper discharge unit 1004. This printer 1000 is a so-called serial printer. In the printer, the recording head performs reciprocating motions over the recording paper to produce a printed record on the paper. The recording head mounted on a carriage scans on the recording paper. The recording paper is fed by a length corresponding to the width recorded as a result of a single scan.

The printer 1000 is provided with an operation panel 1010, which includes a liquid crystal display unit 1006, key switches, and an LED. The printer 1000 further includes a card slot 1009, in which a memory card is inserted. The memory card may include a Compact Flash (registered trademark) memory, a smart media, and a memory stick.

Figure 11:
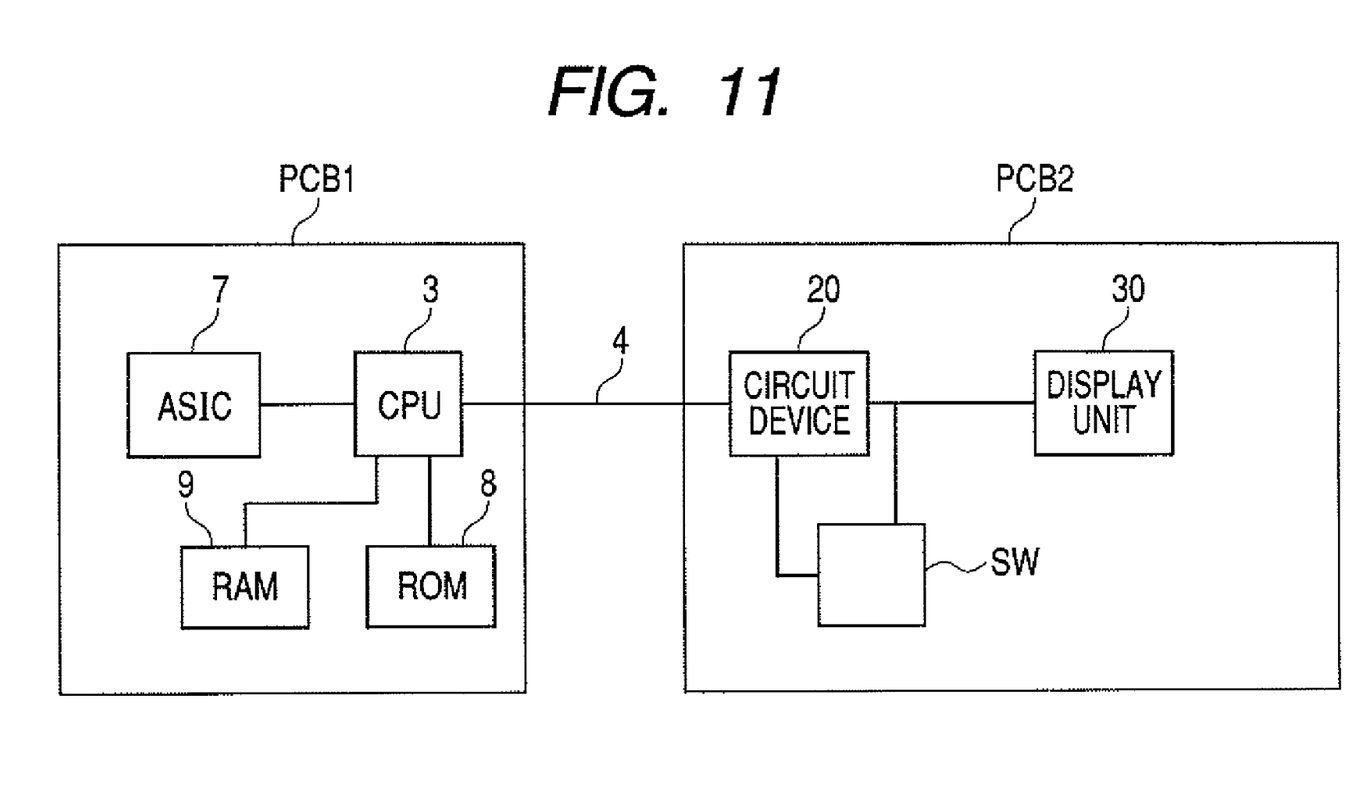
FIG. 11 illustrates a control configuration of the electronic equipment.

FIG. 11 is a control block diagram of the electronic equipment. A PCB 1 is a main circuit board for the electronic equipment. A PCB 2 is a circuit board for the operation panel 1010.

Firstly, the PCB 1 will be described. A CPU 3 controls the printer 1000 based on programs and/or data stored in a ROM 8. For example, the CPU 3 controls scanning by the recording head, feeding of the recording papers, and driving of the recording head. A RAM 9 is a memory used as a working area for the CPU 3. An ASIC 7 transmits and receives data and/or commands to and from the CPU 3.

The PCB 2 will now be described. A circuit device 20 communicates with the CPU 3 via a serial interface 4, for controlling the operation panel. For example, the data to be displayed on the liquid crystal display unit 1006 described above is transferred from the CPU 3 to the circuit device 20.

The circuit device 20 and the display unit 30 in FIG. 11 correspond respectively to the circuit device 20 and the display unit 30 illustrated in FIG. 3A. The SW in FIG. 11 corresponds to eight keys SW11 to SW14 and SW21 to SW24 in FIG. 3A. The display unit 30 corresponds to the LED in the operation panel 1010 illustrated in FIG. 10.

Other Embodiments

While the present invention has been applied to the operation panel in the above embodiment, the present invention has other applications. The load to be driven may be a non-volatile memory such as an EEPROM, besides the LED and the LCD controller.

Further, in the case where the main circuit board is integrated with the circuit board for the operation panel, the CPU 3 or the ASIC 7 provided on the main circuit board may also function as the circuit device 20 described above.

Still further, the present invention may be applied, not only to the printer, but also to a scanner, a personal digital assistant, and other equipment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-162470, filed Jun. 20, 2008, which is hereby incorporated by reference herein in its entirety.

What is claimed is:

1. An output circuit for driving a first load and a second load connected via a terminal, comprising:
   a first output buffer which outputs driving power to the terminal;
   a second output buffer which outputs driving power to the terminal; and
   a control unit which drives both the first output buffer and the second output buffer for controlling the first load with a first driving power in a first period and drives the first output buffer for controlling the second load with a second driving power in a second period, and which performs time-sharing control with the first period and the second period.

2. The output circuit according to claim 1, wherein the control unit includes
   a logic control unit which outputs a logical signal for controlling the first load and a logical signal for controlling the second load, and
   a driving power control unit which enables the first and second output buffers to be driven.

3. The output circuit according to claim 2, wherein in the first period, before shifting from the first period to the second period, the logic control unit outputs the logical signal which is to be output during the second period, and
   the driving power control unit enables both the first output buffer and the second output buffer in the first period and disables the second output buffer in the second period.

4. The output circuit according to claim 2, wherein in the case where the logic control unit changes a logical level of the logical signal during the second period, the driving power control unit enables the first output buffer and disables the second output buffer in and around a predetermined period including the time when the logical level is changed.

5. The output circuit according to claim 1, wherein the first load is an LED, and the second load is a controller of an LCD.

6. The output circuit according to claim 1, wherein the first load is a switch, and the second load is an LED.

* * * * *